(12) United States Patent
Vedala et al.

(10) Patent No.: US 9,852,083 B2
(45) Date of Patent: Dec. 26, 2017

(54) PROCESSING DATA

(71) Applicant: Infineon Technologies AG, Neubiberg (DE)

(72) Inventors: Narasimha Kumar Vedala, Bangalore (IN); Bala Nagendra Raja Munjuluri, Bangalore (IN); Prakash Nayak, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 602 days.

(21) Appl. No.: 14/498,513

(22) Filed: Sep. 26, 2014

(65) Prior Publication Data
US 2016/0092378 A1 Mar. 31, 2016

(51) Int. Cl.
*G06F 3/00* (2006.01)
*G06F 5/00* (2006.01)
*G06F 12/14* (2006.01)
*G06F 11/30* (2006.01)

(52) U.S. Cl.
CPC .......... *G06F 12/1458* (2013.01); *G06F 11/30* (2013.01); *G06F 2212/1052* (2013.01)

(58) Field of Classification Search
None
See application file for complete search history.

(56) References Cited

U.S. PATENT DOCUMENTS

| 6,282,657 | B1* | 8/2001 | Kaplan | G06F 8/60 711/E12.097 |
| 7,210,014 | B2* | 4/2007 | Drasnin | G06F 12/1466 711/154 |
| 7,260,848 | B2* | 8/2007 | Zimmer | G06F 9/4401 380/200 |
| 2003/0167381 | A1* | 9/2003 | Herscovich | G06F 13/1605 711/151 |
| 2012/0215989 | A1* | 8/2012 | Moyer | G06F 12/1416 711/145 |

* cited by examiner

*Primary Examiner* — Elias Mamo
(74) *Attorney, Agent, or Firm* — Schiff Hardin LLP

(57) ABSTRACT

A method for executing a program code is suggested, the method comprising: checking a memory access policy resource based on a trigger; and comparing a current program counter with a program counter information provided by the memory access policy resource and, in case the comparison of the current program counter and the program counter information fulfills a predefined condition, conducting a memory access policy check to allow permitted operations.

18 Claims, 2 Drawing Sheets

PROCESSING DATA

BACKGROUND OF THE INVENTION

Embodiments of the present invention relate to data processing, in particular on a smartcard. Modern smartcard applications required data protection mechanisms that allow for a high degree of variability.

SUMMARY

A first embodiment relates to a method for executing a program code, the method comprising:
checking a memory access policy resource based on a trigger;
comparing a current program counter with a program counter information provided by the memory access policy resource and, in case the comparison of the current program counter and the program counter information fulfills a predefined condition, conducting a memory access policy check.

A second embodiment relates to a device comprising a processing unit, wherein the processing unit is arranged for
checking a memory access policy resource based on a trigger;
comparing a current program counter with a program counter information provided by the memory access policy resource and, in case the comparison of the current program counter and the program counter information fulfills a predefined condition, conducting a memory access policy check.

A third embodiment relates to a smartcard comprising
a processing unit,
a memory,
wherein the processing unit is arranged for
checking a memory access policy resource based on a trigger;
comparing a current program counter with a program counter information provided by the memory access policy resource and, in case the comparison of the current program counter and the program counter information fulfills a predefined condition, conducting a memory access policy check.

A fourth embodiment is directed to a device for processing data comprising
means for checking a memory access policy resource based on a trigger;
means for comparing a current program counter with a program counter information provided by the memory access policy resource and, in case the comparison of the current program counter and the program counter information fulfills a predefined condition, conducting a memory access policy check.

A fifth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
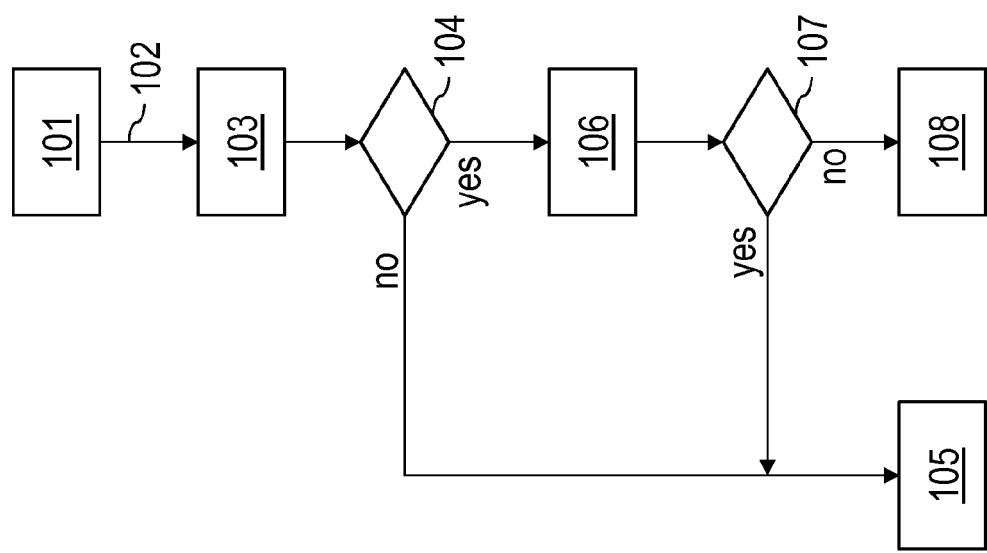
FIG. 1 shows a schematic flow chart comprising such steps that are conducted in order to validate whether the code that is currently executed satisfies required access policies.

Examples suggested provide mechanisms, e.g., for microcontrollers, to allow execution of certain section of code only when particular predefined and/or user-configured conditions are met.

For example, a confidential key handling code may only be executed if at least one of the following conditions is met:
a communication interface is deactivated;
access to the key handling code is provided for a command;
application-specific conditions to conduct the operation on the key are satisfied.

Access to data regions may only be granted in case specified and/or user-configured conditions are met. For example, access to a memory that contains (e.g.) secret keys may only be allowed if the conditions as mentioned above are met.

Examples described herein may in particular allow hardware to solve these issues and to flexibly grant memory access in case predefined conditions were met.

Examples may also provide application-specific conditions under which access to a memory, e.g., to at least one portion of memory, is allowed. Such conditions are referred to as Memory Access Policy (MAP).

The memory may be tagged with the MAP. The memory may comprise code and data. Such memory may refer to memory portions at any level of granularity.

During execution, a processing unit (e.g., central processing unit, CPU) may perform the following checks:
Is the MAP for the code being executed satisfied?
Is the MAP for the data being accessed satisfied?
In case of any of the checks fails, a predefined action may be triggered, e.g., an alarm may be raised and/or a notification may be issued.

For example, two modes may be provided for conducting the MAP check:
In an AUTO mode, the processing unit performs the MAP check at configurable predefined time intervals.
In a MANUAL mode, a special operation (operation code) may be used to trigger the MAP check.

According to an exemplary embodiment, the following entities may be used:
a MAP table;
a MAP_STATUS register;
MAP_CFGx registers;
an operation code: ASSERTMAP.

Hereinafter, these entities are explained in further detail:
MAP Table:
The MAP table may be structured as a table with the following entries (columns):
a start address of the memory;
a size;
a MAP value;
an access permission.

The MAP table may comprise a list of (required) memory access policies (corresponding to the MAP value) for a given memory address range. The memory address range may be defined by a start address and a size.

MAP_STATUS Register:

Each bit in this MAP_STATUS register may correspond to application-specific access policies that are satisfied in the context of a current execution. An association and a setting of these bits may be managed by an application logic.

MAP_CFGx Registers:

These are configuration registers that allow configuring the modes of the MAP checks, i.e. AUTO mode or MANUAL mode.

In AUTO mode, the MAP check is executed at certain time intervals as defined in the MAP_CFGx registers. Hence, in AUTO mode, it may be possible to configure such time intervals at which MAP checks are triggered.

In MANUAL mode, a special operation code "ASSERT-MAP" may be inserted in various location of the code to explicitly trigger the MAP check.

Also the MAP_CFGx registers may be used to configure location and size of the MAP table.

Op Code: ASSERTMAP:

This is an operation code (instruction) that (manually) triggers the MAP check.

Operation

During startup of a chip (hardware), the MAP_CFGx registers are configured with a default value. Such default value may be an AUTO mode that triggers the MAP check at a predetermined time interval. Also, the MAP_STATUS register may be reset. In addition, the MAP table location and/or size may be configured.

During operation, based on application-specific access policies being fulfilled, the application may appropriately set the MAP_STATUS register.

Based on a trigger of a MAP check, the hardware may validate whether the code that is being currently executed satisfies required access policies.

FIG. 1 shows a schematic flow chart comprising such steps that are conducted in order to validate whether the code that is currently executed satisfies required access policies.

In a state 101 a trigger 102 is issued to conduct a MAP check. In a step 103 a look-up to the MAP table is conducted based on the current program counter. In a step 104 it is checked whether the current value of the program counter has an entry in the MAP table. If not, the execution of the program is continued in a step 105. If the MAP table comprises such entry that corresponds to the current value of the program counter, an access policy check is conducted in a step 106.

The current value of the program counter selects an entry in the MAP table. From this entry, a MAP value is retrieved, which corresponds to a memory access policy MAP. This MAP is checked in step 106 as follows:

MAP & MAP_STATUS==MAP ?

In a step 107 it is determined whether the MAP was satisfied. In the affirmative, it is branched off to the step 105. If the MAP was not satisfied, a predefined action may be triggered, e.g., an alarm may be raised and/or a notification may be issued in a step 108.

A similar kind of check can be conducted for data access. To improve the performance, the MAP_CFGx registers may comprise a setting where the check for data access can be turned off. For example, the MAP table may comprise entries corresponding to secure data regions. Before requesting data on an address bus, the processing unit may conduct a check with the MAP table. Such check may occur with every data fetch.

Hereinafter, a sample C code is shown to explain the approach presented in more detail:

pragma MAPENTRY(MAP_VALUE_1, X)//This pragma creates an entry into the MAP table. 'X' indicates an "execute" permission. In this example MAP_VALUE_1 is assigned 0xC000 pragma MAPEXIT; this pragma is the termination for previous MAPENTRY//Example of a MAP Table Structure:

| Memory Start Address | Size | MAP Values | Per-missions |
|---|---|---|---|
| start_address_of (Load_Key) | sizeof(Load_Key function) + sizeof(Update_Key function) | MAP_VALUE_1 | X |
| ... | ... | ... | ... |
| start_address_of ( ... ) | sizeof( ... ) | MAP_VALUE_n | RWX |

The main program may be an endless while-loop as follows:

```
void main( )
{
    while(1)
    {
        receive_command( );
        if(comms_is_disabled)
        {
            MAP_STATUS |= 0x8000; //set the condition that communication module is disabled has been satisfied
        }
        process_command( ); // the function process_command is invoked (see below).
        send_response( );
    }
}
```

The main program calls the function process_command:

```
void process_command( )
{
    switch(current_command)
    {
        case READ_FILE:
            ...
            break;
        case UPDATE_KEY:
            MAP_STATUS |= 0x4000; // set the condition that current command requires access to key store
            Update_Key( );
            MAP_STATUS ^= 0x4000; //reset the condition
            break;
        case ...
        case ...
        default:
            SECALARM( ); // raise security alarm
    }
}
```

The process_command function comprises "UPDATE_KEY" as a current command, which requires access to the key store. Based on the UDATE_KEY command the process_command function invokes the Update_Key function.

```
void Update_Key( ) //This function updates the key in the NVM
{
    identify_free_key_address_in_nvm( );
    validate_new_key_value( );
```

```
    __ASSERTMAP__( ); //This instruction triggers MAP check explicitly
    Store_key( );
}
```

Within the function Update_Key, the ASSERTMAP operation is explicitly invoked, which results in triggering the MAP check.

Also, a function Load_Key may be provided comprising the ASSERTMAP operation that explicitly triggers the MAP check:

```
void Load_Key( )
{
    //This function loads the key from keystore into a symmetric crypto
processor
    resolve_key_address_in_nvm( );
    validate_key( );
    __ASSERTMAP__( ); //This instruction triggers MAP check explicitly
    Load_key_into_SCP( );
}
```

Figure 2:
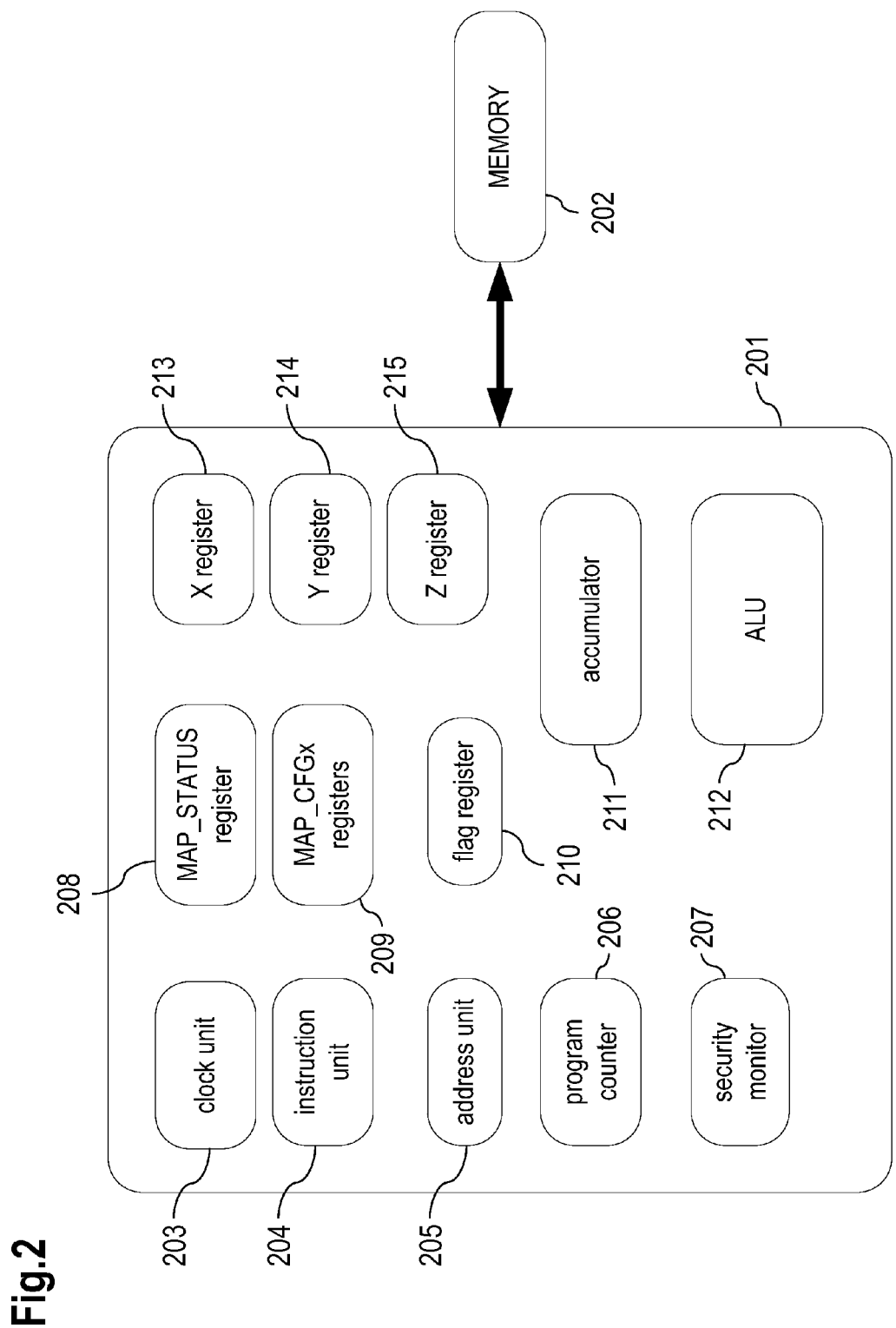
FIG. 2 shows a schematic hardware block diagram comprising a microcontroller and a memory.

FIG. 2 shows a schematic hardware block diagram comprising a microcontroller 201 and a memory 202. Both, microcontroller 201 and memory 202 may be located on a smartcard. The microcontroller 201 may comprise: a clock unit 203, an instruction unit 204, an address unit 205, a program counter 206, a security monitor 207, a MAP_STATUS register 208, MAP_CFGx registers 209, a flag register 210, an accumulator 211, an arithmetic logic unit 212, a X register 213, a Y register 214 and a Z register 215. The memory 202 comprises a MAP table.

The following steps may be conducted when the special operation ASSERTMAP is found in the code triggering the MANUAL mode, i.e. a manual trigger to the MAP check:

step 251: The ASSERTMAP op-code is found, the instruction unit 204 signals this to the security monitor 207.
step 252: The security monitor 207 signals the address unit 205 to fetch an entry i from the MAP table.
step 253: The address unit 205 fetches data from the MAP table's entry i into the following registers:
  a start address location into the X register 213;
  a size into the Y register 214; and
  an expected MAP value into the Z register 215.
step 254: The security monitor 207 checks whether the program counter 206 is in the range [start_address (X), start_address+size (X+Y)], i.e. between the start address according to the X register 213 and the end address determined by the X register 213 and the Y register 214.
step 255: If the program counter 206 is in this range, step 257 is next.
step 256: If the program counter 206 is not in range, the MAP table is checked for further entries. If any such entries exist, it is continued with step 252 to fetch the next entry; if not, it is continued with step 259.
step 257: The security monitor 207 checks if the value of the MAP_STATUS register 208 satisfies the expected MAP value determined by the Z register 215; i.e. whether the following condition is true:
  (MAP_STATUS & Z)==Z
step 258: If the condition of step 257 is true, it is continued with step 259; otherwise, it is continued with step 260.
step 259: The security monitor 207 instructs the instruction unit 204 to decode and execute further instructions (not to jump to step 260).
step 260: The security monitor 207 raises a security alarm.

Hence, the concept allows a hardware to grant or restrict access to a defined portion of memory based on conditions specified by an application logic. These portions of memory may be defined at any granularity by the application. This approach allows reducing the amount of software countermeasures for security thereby resulting in reduction of memory foot print required for the code.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for executing a program code, the method comprising:
  checking a memory access policy resource based on a trigger;
  comparing a current program counter with a program counter information provided by the memory access policy resource and, in case the comparison of the current program counter and the program counter information fulfills a predefined condition, conducting a memory access policy check.

The concept allows a hardware to grant or restrict access to a defined portion of memory based on conditions specified by an application logic. These portions of memory may be defined at any granularity by the application. This approach allows implementing secure code on low cost microcontrollers. It in particular allows reducing the amount of software countermeasures for security thereby resulting in reduction of memory foot print required for the code.

Based on the trigger, the hardware may validate whether the code that is being currently executed satisfies required access policies.

The current program counter may be a value of a program counter of a processing unit (e.g., microprocessor) that points to a portion of program code to be executed.

In an embodiment, the method further comprises:
  not conducting the memory access policy check in case the comparison of the program counter with the program counter information does not fulfill the predefined condition.

In an embodiment, the program counter information comprises a program counter setting or a range for the program counter.

In an embodiment, the comparison of the current program counter and the program counter information fulfills a predefined condition if the current program counter equals the program counter setting or lies within the range for the program counter.

In an embodiment, conducting a memory access policy check comprises:
  retrieving a memory access policy value from the memory access policy resource;
  comparing the memory access policy value with a predefined value;
  continuing executing the program code in case the memory access policy value corresponds to the predefined value;
  conducting a predefined action in case the memory access policy value does not correspond to the predefined value.

As an option, the memory access policy value may be compared with the predefined value which is obtained in the current execution context.

As another option, continuing executing the program code may comprise allowing permitted operations in case the memory access policy value corresponds to the predefined value achieved in the current execution context.

In an embodiment, the predefined action comprises at least one of the following:
triggering an exception;
triggering an interrupt;
issuing an alarm, in particular a security alarm;
issuing a notification.

In an embodiment, the predefined value is a global value comprising application-specific access policies.

The predefined value may in particular be obtained in a current execution context.

In an embodiment, the memory access policy resource is a data structure, in particular a table, stored in the memory.

In an embodiment, the memory access policy resource is a data structure, wherein each entry of the data structure comprises:
a start address of the memory;
a size of the memory;
a memory access policy value;
at least one permitted operation.

In an embodiment, each entry of the data structure further comprises at least one permitted operation.

The permitted operation(s) may comprise at least one of the following: read, write, execute.

In an embodiment, the program counter information is determined based on the start address of the memory and the size of the memory.

In an embodiment, the trigger depends on a predetermined time interval.

In an embodiment, the trigger is based on a predefined operation code.

In an embodiment, the method is run on a processing unit of a secure integrated circuit, a secure microcontroller, a microcontroller or a smart card.

In an embodiment, the memory access policy is applicable for program code to be executed or for data being accessed.

A device is provided comprising a processing unit, wherein the processing unit is arranged for
checking a memory access policy resource based on a trigger;
comparing a current program counter with a program counter information provided by the memory access policy resource and, in case the comparison of the current program counter and the program counter information fulfills a predefined condition, conducting a memory access policy check.

A smartcard is provided comprising
a processing unit,
a memory,
wherein the processing unit is arranged for
checking a memory access policy resource based on a trigger;
comparing a current program counter with a program counter information provided by the memory access policy resource and, in case the comparison of the current program counter and the program counter information fulfills a predefined condition, conducting a memory access policy check.

A device is provided for processing data, said device comprising
means for checking a memory access policy resource based on a trigger;
means for comparing a current program counter with a program counter information provided by the memory access policy resource and, in case the comparison of the current program counter and the program counter information fulfills a predefined condition, conducting a memory access policy check.

A computer program product is provided, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for executing a program code, using a device including a processing unit, the method comprising:
   checking a memory access policy resource based on a trigger, wherein the conducting the memory access policy check comprises:
      retrieving a memory access policy value from the memory access policy resource;
      comparing the memory access policy value with a predefined value;
      continuing executing the program code in case the memory access policy value corresponds to the predefined value; and
      conducting a predefined action in case the memory access policy value does not correspond to the predefined value; and
   comparing a current program counter with a program counter information provided by the memory access policy resource and, in case the comparison of the current program counter and the program counter information fulfills a predefined condition, conducting a memory access policy check.

2. The method according to claim 1, comprising:
   not conducting the memory access policy check in case the comparison of the program counter with the program counter information does not fulfill the predefined condition.

3. The method according to claim 1, wherein the program counter information comprises a program counter setting or a range for the program counter.

4. The method according to claim 3, wherein the comparison of the current program counter and the program counter information fulfills a predefined condition if the current program counter equals the program counter setting or lies within the range for the program counter.

5. The method according to claim 1, wherein the predefined action comprises at least one of the following:
   triggering an exception;
   triggering an interrupt;
   issuing an alarm, in particular a security alarm; and
   issuing a notification.

6. The method according to claim 1, wherein the predefined value is a global value comprising application-specific access policies.

7. The method according to claim 1, wherein the memory access policy resource is a data structure, in particular a table, stored in the memory.

8. The method according to claim 1, wherein the memory access policy resource is a data structure, wherein each entry of the data structure comprises:
   a start address of the memory;
   a size of the memory;
   a memory access policy value; and
   at least one permitted operation.

9. The method according to claim 8, wherein each entry of the data structure further comprises at least one permitted operation.

10. The method according to claim 8, wherein the program counter information is determined based on the start address of the memory and the size of the memory.

11. The method according to claim 1, wherein the trigger depends on a predetermined time interval.

12. The method according to claim 1, wherein the trigger is based on a predefined operation code.

13. The method according to claim 1, wherein the method is run on a processing unit of a secure integrated circuit, a secure microcontroller, a microcontroller or a smart card.

14. The method according to claim 1, wherein the memory access policy is applicable for program code to be executed or for data being accessed.

15. A device comprising a processing unit, wherein the processing unit is arranged for
   checking a memory access policy resource based on a trigger, wherein the conducting the memory access policy check comprises:
      retrieving a memory access policy value from the memory access policy resource;
      comparing the memory access policy value with a predefined value;
      continuing executing the program code in case the memory access policy value corresponds to the predefined value; and
      conducting a predefined action in case the memory access policy value does not correspond to the predefined value; and
   comparing a current program counter with a program counter information provided by the memory access policy resource and, in case the comparison of the current program counter and the program counter information fulfills a predefined condition, conducting a memory access policy check.

16. A smartcard comprising
   a processing unit,
   a memory,
   wherein the processing unit is arranged for
   checking a memory access policy resource based on a trigger, wherein the conducting the memory access policy check comprises:
      retrieving a memory access policy value from the memory access policy resource;
      comparing the memory access policy value with a predefined value;

continuing executing the program code in case the memory access policy value corresponds to the predefined value; and conducting a predefined action in case the memory access policy value does not correspond to the predefined value; and comparing a current program counter with a program counter information provided by the memory access policy resource and, in case the comparison of the current program counter and the program counter information fulfills a predefined condition, conducting a memory access policy check.

17. A device for processing data comprising means for checking a memory access policy resource based on a trigger, wherein the conducting the memory access policy check comprises:

retrieving a memory access policy value from the memory access policy resource;

comparing the memory access policy value with a predefined value;

continuing executing the program code in case the memory access policy value corresponds to the predefined value; and conducting a predefined action in case the memory access policy value does not correspond to the predefined value; and means for comparing a current program counter with a program counter information provided by the memory access policy resource and, in case the comparison of the current program counter and the program counter information fulfills a predefined condition, conducting a memory access policy check.

18. A tangible computer program product directly loadable into a memory of a digital processing device, comprising software code portions for performing the steps of the method according to claim 1.

* * * * *